United States Patent [19]

Payne

[11] 3,829,213

[45] Aug. 13, 1974

[54] ARTPROOF METHOD FOR SEMICONDUCTOR DEVICES

[75] Inventor: P. Donald Payne, Chalfont, Pa.

[73] Assignee: Mos Technology, Inc., Valley Forge, Pa.

[22] Filed: June 2, 1972

[21] Appl. No.: 259,016

[52] U.S. Cl. .......... 355/79
[51] Int. Cl. .......... G03b 27/02
[58] Field of Search .......... 355/4, 79; 95/85

[56] References Cited

UNITED STATES PATENTS

| | | | |
|---|---|---|---|
| 2,586,772 | 2/1952 | Ashby | 343/9 |
| 2,779,017 | 1/1957 | Land | 343/7.7 |
| 2,986,466 | 5/1961 | Kaprelian | 355/4 X |
| 3,130,655 | 4/1964 | Meyer | 355/4 |

FOREIGN PATENTS OR APPLICATIONS

| | | | |
|---|---|---|---|
| 952,052 | 11/1956 | Germany | 355/79 |

*Primary Examiner*—John M. Horan
*Attorney, Agent, or Firm*—Cooper, Dunham, Clark, Griffin & Moran

[57] ABSTRACT

A method of checking the adherence to design rules, circuit configuration requirements and registration in artwork patterns to be used as masks in the fabrication of semiconductor devices, by forming a composite multicolor display of the artwork, before the masks have been made, wherein each pattern except one or more is presented in a unique color and the remaining pattern is represented by the absence of a color. The method includes contact printing a succession of artwork sheets on a base sheet, in registry with each other, each such sheet being printed in a unique color. In order to represent a selected artwork sheet by the absence of a color, a negative film copy is made of that artwork sheet and the copy is registered with another artwork sheet. The combination of the negative film copy and artwork sheet is then printed onto the base sheet in a selected color to form a subtraction image, i.e., only those portions of the artwork sheet which do not coincide with opaque areas on the negative copy are printed on the base sheet. This method of representing an artwork pattern by a missing color is particularly useful where the pattern represented by the missing color occurs, usually or exclusively, within areas of the pattern on another artwork sheet, as for example, where the pattern represented by missing color corresponds to a mask for cutting contact holes in MOS (metal-oxide-silicon) devices.

15 Claims, 24 Drawing Figures

ARTPROOF METHOD FOR SEMICONDUCTOR DEVICES

BACKGROUND OF THE INVENTION

The invention relates generally to fabricating semiconductor devices and, more specifically, to checking the adherence to design rules and intended circuitry configuration, as well as the registration, of artwork sheets from which masks are made to fabricate semiconductor devices.

When a suitable schematic for a semiconductor device has been designed, a topological layout for each photo process stage of the device is made, and then a high precision reproduction of each such layout is produced. These reproductions are known as "artwork." The material typically used for artwork preparation consists of a clear sheet of material such as "Mylar" covered with a thin red film. The artwork is produced by cutting and stripping or peeling the red film at selected locations to produce a pattern corresponding to the pattern of the photo process stage to be represented by the particular artwork sheet. This cutting may be done by hand, or by a computer-driven plotter using a knife instead of a pen. After cutting and stripping, each artwork sheet consists of clear areas on a red background, and corresponds to a particular mask level of the semiconductor device for which it is intended. A mask may be produced from each artwork sheet by conventional photoprojection techniques. The artwork sheets are generally many times, and typically about 200 times, the size of the masks for which they are intended.

It is important that the patterns on the different artwork sheets to be used for a single semiconductor device be in proper registration with each other, because otherwise the masks produced from the artwork sheets will not register with each other, and the photoresist patterns on the semiconductor device produced by the use of these masks will similarly be misaligned, thus producing misaligned layers of the semiconductor device, and possibly a defective device.

Also, it is important that the artwork adhere to certain design rules and to the intended circuit configuration. An illustrative design rule for certain MOS semiconductor devices is that the metallic gate must overlap the gate oxide by 0.2 mils on all edges. Thus, if the gate oxide is depicted on an artwork sheet by the color red, and the metal on another sheet by the color tan, when the artwork sheets are successively printed onto a base, an observer should see tan over red in the gate oxide area and at least 0.2 mils of tan extending beyond the red at all edges. Otherwise a design rule violation is present. Another design rule might be a minimum clearance between conductors, or any other criteria which are found to be important for the quality and reliability desired in the end product.

An example of a circuit configuration requirement might be that a conductive connection should be made to a given semiconductor area, such as a source or drain of an MOS semiconductor device. Also, it might be necessary that the conductor cover the entire source or drain area. Thus, if the area in question is green on an artwork sheet, and the metal is tan on another sheet, when the sheets are successively printed on a base, the observer should always see the green with tan. If pure green appears it represents a circuit error.

The importance of making sure that the patterns on artwork sheets are in proper registration with each other has been recognized for some time, and there have been many attempts in the past to insure proper registration. One such attempt is a method shown in Drake et al. U.S. Pat. No. 3,202,509 and Middleton, Jr. U.S. Pat. No. 3,288,607, and involves making a multicolor master drawing by means of affixing by hand on a transparent base sheet a plurality of strips in different colors, where each color corresponds to a specific level mask. The multicolor master drawing is then photographed through different color filters to make the individual masks. Since all the masks are obtained from the same master drawing, and presumably by means of the same photographic equipment, it can be assumed that the several masks will be in the same registration with respect to each other that the colored strips are on the multicolor master drawing. This method necessarily involves making the master drawing by hand, since it is not possible to use computer driven plotters to make the superimposed master drawing. Further, the ultimate in photographic resolution is required for this process, while the photographing of various spectral colors precludes the use of a lens optimized for a single wavelength, and requires a broadband photographic emulsion, so that resolution is necessarily sacrificed. Moreover, it is desirable to have the pattern for each mask on a separate sheet, so that additions, deletions and other changes can be made on each individual pattern without disturbing the other patterns — which is not possible with this type of multicolor master.

A prior art method of checking the registration, not of artwork sheets, but of masks used in the manufacture of semiconductor devices, is shown in Heinz U.S. Pat. No. 3,555,172, and involves forming a superimposed composite multicolor video image of several masks, where each mask is represented by a different color. The video image is formed by viewing each of the masks through a separate TV camera. Each camera is equipped with its own lens system and each camera produces on a monitor an image in a unique color. This method imposes very stringent accuracy requirements on the TV cameras and their lens systems, is susceptible to imbalance, and involves expensive equipment. Moreover, and more importantly, it permits a registration check only after the time and money has been spent to produce the photomasks, whereas the method of the present invention permits detection and correction of errors before the masks have been made.

Another technique for checking the registration of masks used in the manufacture of semiconductor devices, which also suffers the disadvantage that no check is made until the expensive masks have already been completed, is shown in Kerwin U.S. Pat. No. 3,506,442. This involves a microscopic examination of a recording medium whose size is comparable to the size of the masks, and which has been successively sensitized, exposed, and developed in a series of repetitive steps, exposure being effected in each of the successive steps through the masks which are later employed sequentially in the fabrication of an integrated circuit. Since the masks which are used for projection printing of the pattern thereon are microscopic, optical inaccuracies may result which may obscure an actual error. Additionally, because of the small size and the lack of color, the contrast between the images of different masks may not be sufficiently clear to facilitate effective visual inspection of the resulting composite image.

Other prior art of possible interest includes Oliver U.S. Pat. No. 3,519,132, which relates generally to forming composite colored transparencies; Greenfield U.S. Pat. No. 3,588,502, which relates to a method of color subtraction of X-ray images; and Goodman U.S. Pat. No. 3,600,087, which relates to making map transparencies by projecting different combinations of mutually registered overlays, wherein the resulting map transparency has only one color at any particular point.

Although the importance of checking the registration of artwork sheets has thus been recognized in the prior art, the need still exists for an efficient, convenient, inexpensive and accurate method of checking registration, and the present invention is directed to that need.

SUMMARY OF THE INVENTION

The invention is in the field of checking the registration and fidelity of patterns on artwork sheets for photomasks employed in fabricating semiconductor devices, before the photomasks have been made.

A plurality of patterns which are on separate sheets are checked by forming a superimposed composite multicolor display of the patterns. The display is formed by contact printing in a first color an artwork sheet containing a first pattern, at the same magnification as the pattern, which is approximately 200 times the size of the photomask later to be produced from the artwork, and then successively registering and printing in different colors subsequent artwork sheets containing different patterns onto the same base sheet. The result is a superimposed multicolor display of overlapping patterns in which each pattern is represented by a unique color, the display being of the same magnification as the patterns.

In order to provide greater color contrast, a selected subsequent pattern or patterns is represented by the absence of a color. To this end, an image, such as a negative film copy, of the selected pattern is registered with another selected pattern and the registered patterns are printed on the base sheet such that only those portions thereof which do not coincide are printed in a selected color. The result is a multicolor display superimposing the images of the pattern on artwork sheets where *n* artwork sheets are represented in *n*-1 or more colors. If one pattern occurs exclusively within another, at most *n*-2 colors overlap in the case of multicolor display of images of *n* artwork sheets.

This method of checking the registration of patterns is specifically directed to checking the registration, and the adherence to design rules and intended circuit configuration, of patterns on artwork sheets which represent different level masks for fabricating semiconductor devices.

BRIEF DESCRIPTION OF THE DRAWINGS

FIGS. 1*a* through 1*d* show pattern sheets having clear pattern areas on a red background.

FIGS. 3*a* through 3*d* show successive stages of forming on the base sheet images of the patterns of FIGS. 1*a* through 1*d*.

FIGS. 4*a* through 4*d* are partial sectional views along line 4—4 of FIGS. 3*a* through 3*d*, respectively.

FIGS. 6*a*, 6*b* and 6*c* show successive stages of forming on a base sheet images of the patterns shown in FIGS. 1*b* and 1*d* of the combination shown in FIG. 5.

FIGS. 7*a*, 7*b* and 7*c* are partial sectional views along line 7—7 of FIGS. 6*a*, 6*b* and 6*c*, respectively.

FIGS. 8*a*, 8*b* and 8*c* are partial sectional views along line 8—8 of FIGS. 6*a*, 6*b* and 6*c*, respectively.

DETAILED DESCRIPTION

Figures 1, 2, 3, 4, 5, 6, 7, 8, 9:
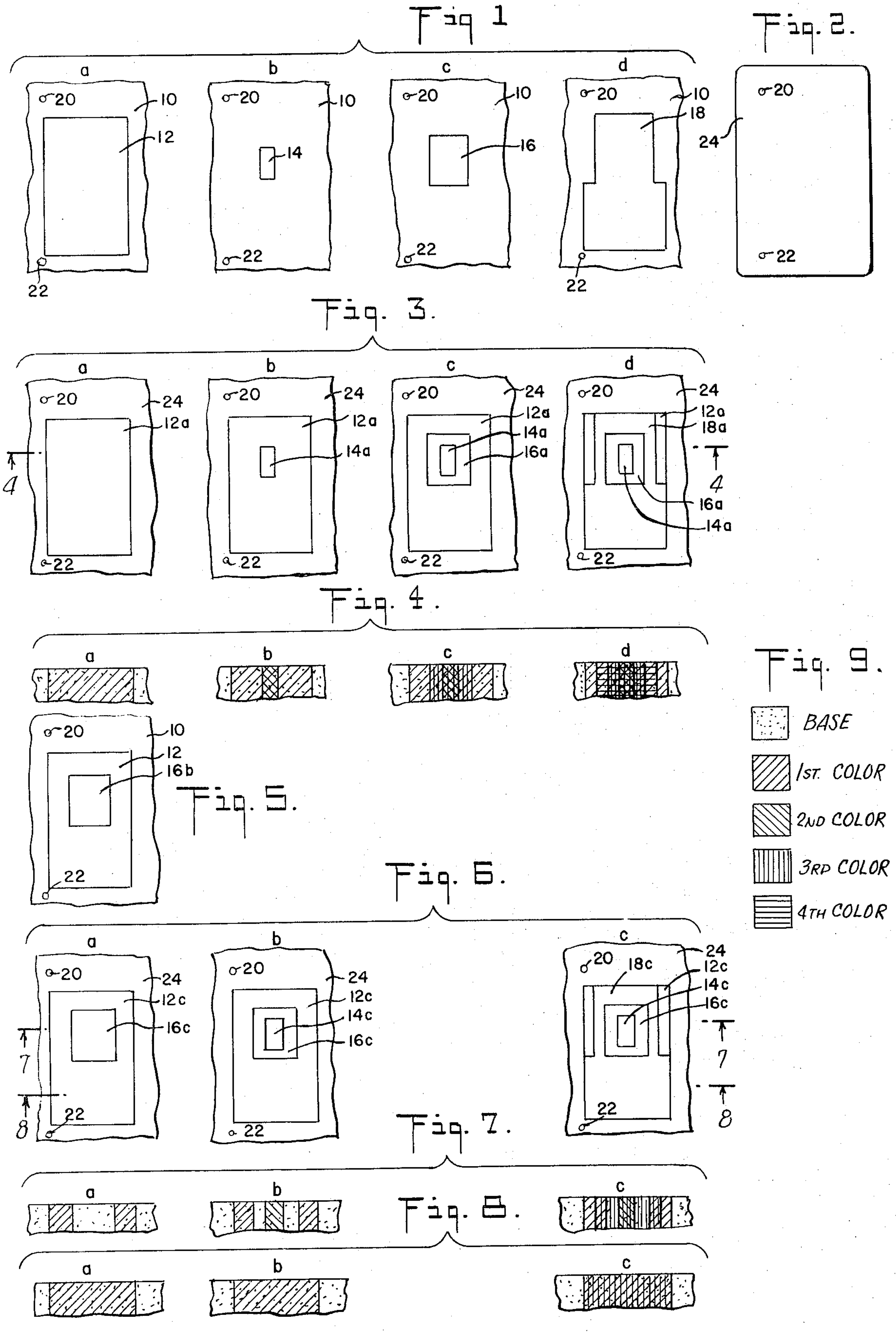
FIG. 2 shows a base sheet provided with registration marks.
FIG. 5 shows a combination of the pattern sheet shown in FIG. 1*a* and a negative film copy of the pattern sheet of FIG. 1*c*.
FIG. 9 contains a series of blocks showing a legend for the colors depicted in FIGS. 3, 7 and 8.

Before describing the invented method as applied to checking artwork sheets from which masks are made for the fabricating of semiconductor devices, a simplified illustration is given for checking the registration of four pattern sheets, each of which may be a portion of an artwork sheet, or a pattern sheet used for other purposes.

FIGS. 1*a* through 1*d* each show a pattern sheet comprising a red background 10 which may, for example, have a pattern thereon represented by a clear area. As already indicated, this may be produced by utilizing a rubylith sheet, formed of clear "Mylar" covered with a red film, which film has been cut in the shape of the pattern, manually or by means of a computer controlled cutting stylus, and then the cut area stripped or peeled to form the clear pattern.

In FIG. 1*a* there is a large rectangular pattern 12; in FIG. 1*b* there is a small rectangular pattern 14; in FIG. 1*c* there is a larger rectangular pattern 16; and in FIG. 1*d* there is a polygonal pattern 18. The pattern sheets shown in FIGS. 1*a* through 1*d* may be used for successive projection or for contact printing onto a base sheet, which base sheet is coated with a layer of photosensitive material of a different color for each such printing. For example, the pattern sheets shown in FIGS. 1*a* through 1*d* may be used for contact printing by overlaying one of these pattern sheets on a base sheet coated with photosensitive material of a first color, exposing the coating to an ultraviolet light source through the pattern, and then washing off either the exposed or the unexposed part of the coating, so as to leave a position or negative of the pattern in the first color. Each successive pattern may be printed in a different color (resulting from successively applied layers of photosensitive materials of different colors) so as to distinguish the different patterns which are superimposed in the resulting multicolor display.

Each of the pattern sheets shown in FIGS. 1*a* through 1*d* are provided with a pair of registration marks 20 and 22, which may be apertures, and the base sheet 24 shown in FIG. 2 is also provided with a similar pair of registration marks 20 and 22, which may be pins. To form a multicolor display, the base sheet 24 is coated with a layer of photosensitive material in a selected color, for example blue, and the pattern sheet of FIG. 1*a* is overlayed on the coated side of the base sheet 24, such that the registration marks 20 and 22 of the pattern sheet and of the base sheet are in registry. An image of the clear area 12 may then be printed in blue on the base sheet 24 by exposing the coating on the base sheet 24 to ultraviolet light through the FIG. 1*a* pattern sheet, and then washing off the blue coating from the area of the base sheet 24 which was not directly under the clear area 12 during exposure. The resulting image is shown in FIG. 3*a* and constitutes a blue rectangle 12*a* over the background of the base sheet 24. The blue rectangle 12 is the same in size as the rectangular clear area 12 of the pattern of FIG. 1*a*.

The base sheet 24 is then coated with another layer of photosensitive material of a different color, for example red, with the red layer overlapping the blue image 12a. The FIG. 1*b* pattern sheet is then overlayed on the coated side of the base sheet 24, and is registered therewith by means of the registration marks 20 and 22, in the same manner as the FIG. 1*a* pattern sheet, and the red coating on the base sheet 24 is exposed to ultraviolet light through the FIG. 1*b* pattern sheet to form on the base sheet 24 a red image of the clear area 14 of the FIG. 1*b* pattern. The resulting display on the base sheet 24 is shown in FIG. 3*b* and consists of a small red rectangular image 14*a* on the larger blue rectangular image 12*a*.

The base sheet 24 may then be coated with a layer of photosensitive material of a third color, for example green, and the pattern 16 of FIG. 1*c* may be printed thereon in the same manner. The resulting multicolor display is shown in FIG. 3*c* and consists of a green image 16*c* on the red image 14*a* and the blue image 12*a*.

Finally the base sheet 24 is coated with a layer of photosensitive material in a fourth color, for example tan, and the pattern 18 of FIG. 1*d* is printed thereon in the same manner. The resulting multicolor display is shown in FIG. 3*d* and consists of a polygonal tan image 18*a* on the green image 16*a* and red image 14*a*, and partly overlapping the blue image 12*a*.

As the photosensitive colors are applied successively, and each exposed to one of the artwork patterns and then rinsed off, the remaining color sinks into the pores of the coarse surface of the base sheet 24, presumably by absorption or adsorption. Moreover, as each color is thus applied over the preceding color, it passes into some of the pores of the base sheet already occupied by the preceding colors, and into other pores, so that the color build-up does not appear as one color layer over another, but as a composite blending of the colors applied, which is of course different for the different areas of the composite image since different combinations of colors are applied to different areas.

The multicolor displays of FIGS. 3*a* through 3*d* are shown in FIGS. 4*a* through 4*d* in sections taken along line 4—4 of FIGS. 3*a* through 3*d*. In FIG. 4*a*, the base sheet 24 is impregnated with a blue image 12*a;* in FIG. 4*b* the red image 14*a* is on the blue image 12*a;* in FIG. 4*c* the green image 16*a* is on the red image 14*a* and partly overlaps the blue image 12*a;* and in FIG. 4*d* the tan image 18*a* is on the green image 16*a* and red image 14*a*, and partly overlaps the blue image 12*a*.

It should be apparent that when only a few patterns are involved, only a few colors of the resulting multicolor display can overlap, and it is easy to distinguish all of the images. It should also be apparent, however, that when many patterns are involved, it may be difficult to distinguish all of the images, especially in areas where several overlap. Referring to FIG. 4*d*, for example, a portion of the blue image 12*a* overlaps three other images, and it may be difficult to detect a discontinuity in the blue image 12*a* even though each of the images 12*a*, 14*a*, 16*a* and 18*a* is at least partly transparent.

To avoid such cluttering of colors and resulting difficulties in distinguishing color contrast when a number of patterns are involved, a particular pattern is advantageously represented by the lack of color, rather than by a specific color. For example, the pattern shown in FIG. 1*c* may be represented by a lack of color, with a resulting improvement in color contrast. In particular, a negative film copy may be made of the pattern sheet of FIG. 1*c* such that the clear pattern 16 of FIG. 1*c* becomes an opaque image on the negative film copy, and the red area 10 becomes clear in such copy. The FIG. 1*a* pattern sheet and the negative film copy made from the pattern sheet of FIG. 1*c* may then be brought in contact with each other, and registered by means of their respective registration marks 20 and 22. The resulting combination is shown in FIG. 5 where the opaque image of the negative film copy is labelled 16*b*. When this combination is printed on the base sheet 24 in a single color (e.g., blue), by the process described earlier, the resulting display of the two patterns is in a single color, as shown in FIG. 6*a*. More specifically, the rectangular image 16*c* of FIG. 6*a*, which corresponds to the opaque image 16*b* of the combination shown in FIG. 5, is not in color. Rather, it is in the background color of the base sheet 24. This image is surrounded by a blue image 12*c* confined to the outlines of the pattern 12 of FIG. 1*a* with the central pattern 16 of FIG. 1*c* removed.

To form a multicolor display including the FIGS. 1*b* and 1*d* patterns, as well as the patterns of FIGS. 1*a* and 1*c*, the base sheet 24, with the blue image of FIG. 6*a* thereon, is coated with another layer of photosensitive material, for example red, and the pattern of FIG. 1*b* is printed thereon by the technique already described. The resulting multicolor display is shown in FIG. 6*b*, and consists of a rectangular red area 14*c* within the noncolor image 16*c*, which in turn is within the blue image 12*c*. The pattern of FIG. 1*d* is then printed in a different color, such as tan, over the multicolor display of FIG. 6*b*, by the technique described. The resulting multicolor display, which now includes the four patterns shown in FIGS. 1*a* through 1*d*, has only three colors, as will be apparent from an examination of FIG. 6*c* where the tan image 18*c* is on the red image 14*c* and the noncolor image 16*c*, and partly overlaps the blue image 12*c*. It is noted that in this display at most two colors overlap, since the red image 14*c* is entirely within the noncolor image 16*c*, and in any event, the four patterns of FIGS. 1*a* through 1*d* would be represented by at most three overlapping colors using this missing color approach.

Referring to FIGS. 7*a*, 7*b* and 7*c*, which show respectively sections of FIGS. 6*a*, 6*b*, and 6*c*, taken along line 7—7, it is clear that there is an improvement in color contrast. In FIG. 7*a* there is only one color in the base sheet 24, namely, the blue image 12*c;* in FIG. 7*b* there are two colors, namely, the blue image 12*c* and the red image 14*c*. The blue and the red, however, do not overlap. In FIG. 7*c*, the tan image 18*c* is added.

FIGS. 8*a*, 8*b* and 8*c* show sections taken along line 8—8 of FIGS. 6*a*, 6*b* and 6*c*, respectively, and show the colors appearing in those sections. It is also clear from examining FIGS. 8*a*, 8*b* and 8*c* that color contrast is improved. Further, it is clear that where one pattern occurs within another pattern on the multicolor display, as for example, where the image of the pattern of FIG. 1*b* occurs within the image of the pattern of FIG. 1*c*, $n$ colors result in at most $n$-2 different colors overlapping. As seen in FIG. 7*c*, this situation results in tan with blue or tan with red, but not in three overlapping colors. In the worst possible case, as already indicated, the four patterns of FIGS. 1*a* through 1*d* would be represented by three overlapping colors.

It is noted that the combination of a negative film copy and a pattern sheet may be used to print either the first or a subsequent image on the base sheet.

Artwork sheets from which masks are made for fabricating semiconductor devices typically comprise a transparent sheet made of material such as clear "Mylar" with a transparent red surface thereon. Once the red surface is cut and stripped, as explained, the clear areas form a pattern corresponding to the pattern of clear areas of a mask which is later to bee made from the artwork sheet. The artwork sheets correspond to the pattern sheets of FIGS. 1*a* through 1*d*, but generally have a multitude of clear areas, as opposed to the single clear area on each of the pattern sheets of FIGS. 1*a* through 1*d*. Also, as already explained, the artwork sheets are many times the size of the masks for which they are intended. Typical sizes for artwork sheets are 27" by 30", 30" by 40" and 37 ½" by 54". Typically a number of successive masks are used in the manufacture of a semiconductor device, and accordingly, there are a number of artwork sheets. For example, in the manufacture of metal oxide semiconductor devices, there may be a first mask for P-diffusion, a second mask for a thin oxide layer for gates and contact holes, a third mask for cutting contact holes and a fourth mask for metal contacts. Each of the artwork sheets has thereon registration marks, such as marks 25 and 22, and the pattern on the artwork sheet is centered with respect to these registration marks. Moreover, the same registration marks may be used later when making masks from the artwork sheets.

To check the mutual registration and fidelity of a plurality of artwork sheets, the artwork sheets are first aligned with each other by using the registration marks thereon. For example, the artwork sheets are laid one by one on a light table and are successively taped to each other such that the registration marks thereon are in alignment. The alignment is critical and it must be ensured that the registration marks of the several artwork sheets are perfectly congruent. The set of aligned and taped artwork sheets is then punched at two or more locations which are outside the patterns thereon to provide registration holes for pin-registration later in the process.

A suitable base sheet of comparable size is then selected. The base sheet may be identical in size with the artwork sheets or it may be somewhat larger. The base sheet is provided with registration holes arranged in the same manner as the registration holes punched in the artwork sheets. The base sheet is secured in a dry film process tub, and a thin uniform layer of photosensitive material of a first color is formed thereon. For example, a puddle of a photosensitive material known as Process Red is poured onto the base sheet, and the puddle is spread into a thin uniform coat by smooth rapid XY strokes with a rubbing block and wipes. The coated and dried base sheet is then placed on a suitable copy board and a first artwork sheet is placed over its coated side, and pin-registered therewith by means of the registration holes in the base sheet and in the artwork sheet. The photosensitive material on the base sheet is then exposed to an ultraviolet light source through the artwork sheet in contact therewith, the light source preferably being about as large as the artwork sheets. Then the coated and exposed base sheet is removed, rinsed in water using a stiff spray, drained, placed into an empty tub, and washed with dilute ammonia to remove those portions of the original continuous photosensitive Process Red layer thereon which were not directly under the clear areas of the pattern on the artwork sheet.

The base sheet is then dried, and the side of it which has the red image is recoated with a uniform layer of photosensitive material of a different color. Then, another artwork sheet is placed thereon and pinregistered, and the process is repeated. The image of each artwork sheet is printed on the base sheet in the same manner in a color which is different from any color previously printed on the base sheet.

In order to represent a selected artwork sheet by a missing color, rather than by a color, a negative film copy is made of one of the artwork shets, such that the clear areas of the pattern on the selected artwork sheet become opaque areas on the film copy and the red background areas on the artwork sheet become clear on the film copy. The film copy may be formed by contact printing and is the same size as the artwork sheet. The film copy is then used instead of the artwork sheet in the course of making the multicolor display. In particular, the film copy is aligned with the other artwork sheets, and registration holes are punched through the aligned set of the artwork sheets and the film copy, as described earlier. The film copy is then aligned by means of the registration holes with an artwork sheet, and with the base sheet, which has been coated with a layer of photosensitive material in a selected color. The base sheet is then exposed to ultraviolet light through the combination of the negative film copy and the artwork sheet aligned therewith, and the resulting image on the base sheet is a subtraction image in the selected color, i.e., it is the image of the artwork sheet minus the opaque areas on the negative film copy.

Representing the pattern on a selected artwork sheet by means of a missing color is particularly advantageous where the pattern occurs exclusively or mainly within another pattern. For example, the pattern which is represented by a missing color may be the pattern corresponding to the mask for cutting contact holes in the fabrication of MOS (metal-oxide-conductor) devices.

It should be apparent that the patterns of the artwork sheets whose registration is being checked by the process described above may be represented other than as clear areas on a red background, and that printing other than contact printing on a base sheet coated with a layer of photosensitive material may be used to carry out the process described above. For example, the artwork sheets may have patterns of opaque areas on clear backgrounds, or clear areas on opaque backgrounds, or areas in two different colors. Similarly, projection printing may be used instead of contact printing, and the multicolor display may be formed on a transparency or on other types of recording media. Further, the process may include two or more missing color steps, each performed by combining a negative image of an artwork pattern with another artwork pattern, in the manner described, so that two or more patterns are represented by missing colors in the final composite display.

What is claimed is:

1. Method of forming a composite multicolor display of superimposed images of the patterns on artwork sheets representing different level masks for fabricating semiconductor devices by successively registering individual artwork sheets with a base sheet of comparable size and forming on the base sheet a permanent image of the pattern on each registered artwork sheet in a color different from the color of any image previously formed on the base sheet, each successive image formed over the base sheet and over any previously formed permanent image thereon, including forming on the base sheet a substraction image by subtracting the pattern of one or more artwork sheets from the pattern of another artwork sheet and forming on the base sheet an image of only the noncongruent portions of the one or more artwork sheets and the other artwork sheets in a color different from the color of any image previously formed on the base sheet.

2. Method as in claim 1 wherein said subtraction image is formed by forming a negative film copy of one artwork sheet wherein the pattern areas are opaque and the non-pattern areas are transparent, registering the negative film copy with another artwork sheet, and printing on the base sheet an image of those portions of the pattern on said other artwork sheet which are not obscured by the opaque areas of the negative film copy.

3. Method as in claim 2 including critically aligning the artwork sheets and the negative film copy with each other, punching identically arranged registration holes through the aligned artwork sheets and film copy and through a base sheet of comparable size, and pin-registering through said registration holes at said registering steps.

4. Method as in claim 1 wherein each of said images on the base sheet is formed by contact printing, whereby the images on the base sheet are the same size as the patterns on the artwork sheets.

5. Method as in claim 1 including associating unique selected colors with selected level masks represented on the artwork sheets, and forming the images on the base sheet in a selected order representing a selected order of masks.

6. Method as in claim 1 wherein the patterns on the artwork sheets are magnifications of the corresponding patterns on the masks for fabricating semiconductor devices.

7. Method of forming a composite multicolor display for checking the registration of patterns on artwork sheets representing different level masks for fabricating semiconductor devices, comprising the steps of:

registering a first artwork sheet with a base sheet of comparable size and printing a permanent image of the artwork pattern on the base sheet in a first color;

successively registering subsequent artwork sheets with the base sheet in the same manner as the first artwork sheet and printing a permanent image of the pattern of each of said subsequent artwork sheets on the base sheet in a color which is different from any color previously printed on the base sheet, each successive image being printed over the base sheet and any previously printed permanent image thereon;

thereby forming on the base sheet a composite multicolor display of superimposed artwork pattern image in which each mask level is represented in a unique color, with an overlap of colors, said multicolor display being of comparable size with the artwork sheets.

8. Method as in claim 7 wherein said printing steps include contact printing of artwork sheets on the base sheet, whereby the pattern images on the base sheet are the same size as the patterns on the artwork sheets.

9. Method as in claim 7 including selecting two of said artwork sheets and printing on the base sheet a composite image of the two selected artwork sheets which image consists only of areas of the pattern on one of said selected sheets which do not coincide with the pattern of the other one of said selected artwork sheets.

10. Method as in claim 7 including selecting a first and a second of said artwork sheets, making a negative film copy of the first selected sheet, registering the negative film copy with the second selected artwork sheet, and printing on the base sheet the registered negative film copy and the second selected artwork sheet in a selected color to thereby represent the first selected artwork sheet by the absence of the selected color representing the second selected artwork sheet.

11. Method as in claim 10 wherein each of said printing steps includes contacting printing, whereby the images formed on the base sheet are the same size as the patterns on the artwork sheets.

12. Method of checking the mutual registration of a plurality of patterns on separate sheets by forming a superimposed composite multicolor display of said patterns, comprising the steps of:

registering a first pattern sheet with a base sheet of comparable size and printing a permanent image of the pattern thereon on the base sheet in a first color;

successively registering subsequent pattern sheets with the base sheet in the same manner as the first pattern sheet and printing a permanent image of the pattern of each of said subsequent pattern sheets on the base sheet in a color which is different from any color previously printed on the base sheet, each successive image being printed over the base sheet and any previously printed image thereon;

thereby forming on the base sheet a superimposed multicolor display in which each pattern is represented by a unique color, with an overlap of colors, said multicolor display being of comparable size with the patterns.

13. Method as in claim 12 including printing a first selected pattern through an image of a second selected pattern to print on the base sheet only those portions of the first selected pattern which do not coincide with the image of the second selected pattern.

14. Method as in claim 12 including making a negative film copy of a first selected pattern, registering the film copy with a second selected pattern, and printing the combination of the registered film copy and second selected pattern to form on the base sheet a subtraction image of said first and second selected subsequent patterns.

15. Method as in claim 12 wherein the printing steps include contact printing, whereby the images of patterns on the base sheet are the same size as the patterns.

* * * * *